Oct. 16, 1962 A. S. TAYLOR ET AL 3,058,177
RAPID HEAT STERILIZATION OF BOTTLES
Filed Aug. 20, 1959 3 Sheets-Sheet 1
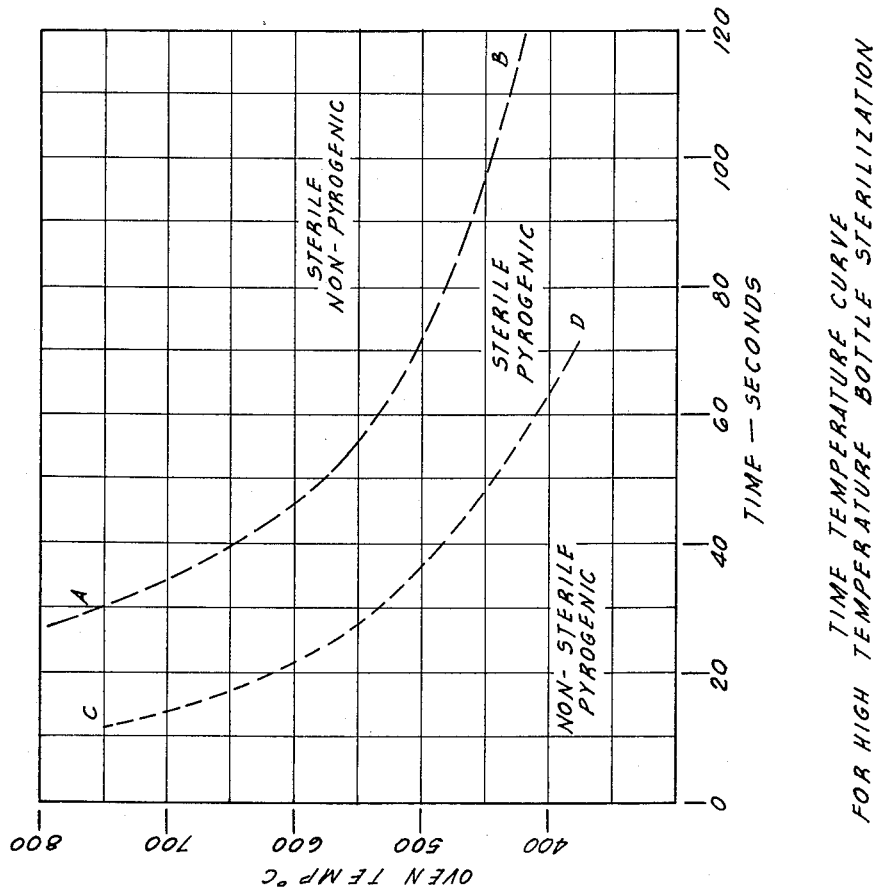
INVENTORS.
ARTHUR SINCLAIR TAYLOR,
JOSEPH AMES CORLEY,
BY
*Samuel Branch Walker*
ATTORNEY.

Oct. 16, 1962     A. S. TAYLOR ET AL     3,058,177
RAPID HEAT STERILIZATION OF BOTTLES
Filed Aug. 20, 1959     3 Sheets-Sheet 2
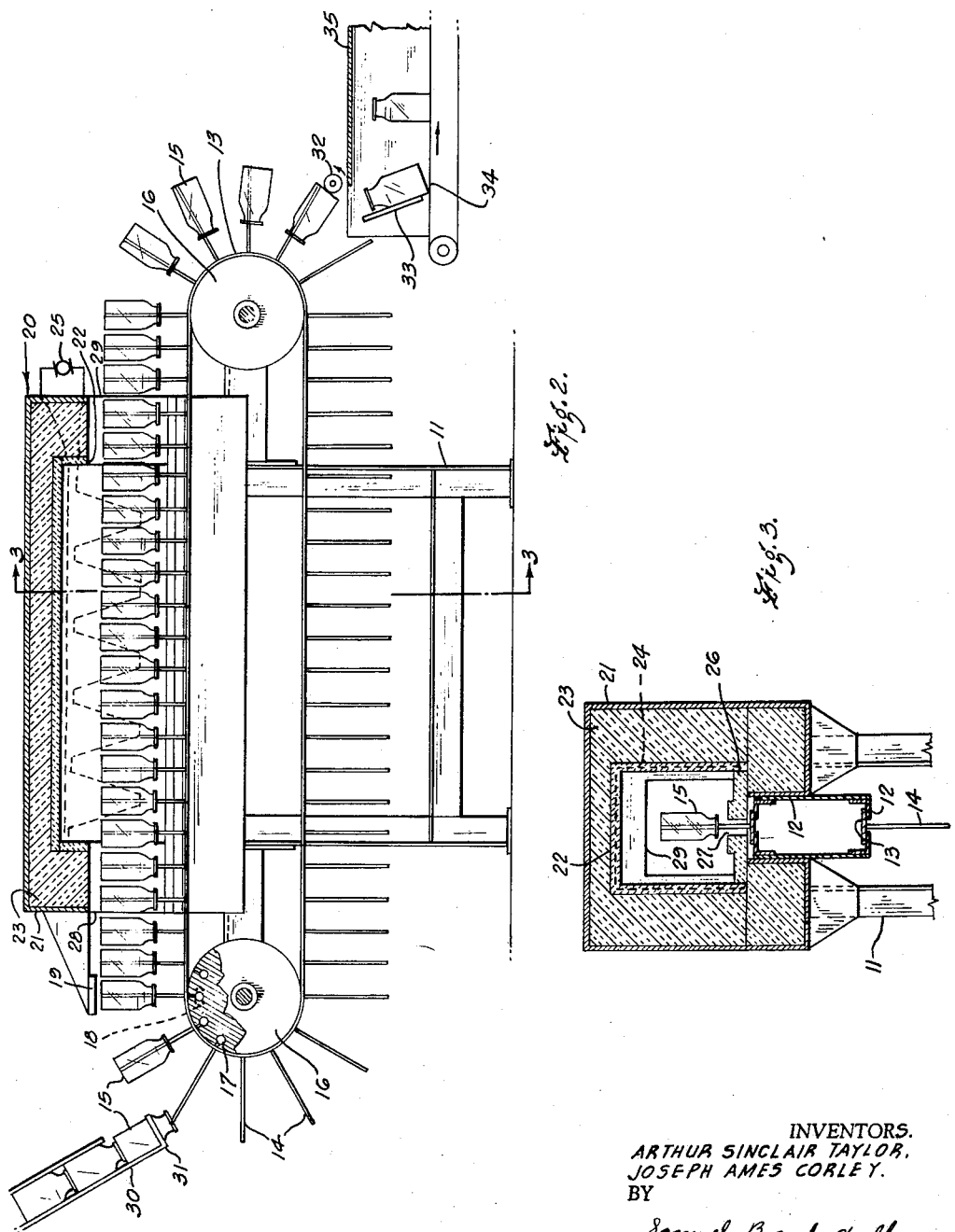
INVENTORS.
ARTHUR SINCLAIR TAYLOR,
JOSEPH AMES CORLEY.
BY
*Samuel Branch Walker*
ATTORNEY.

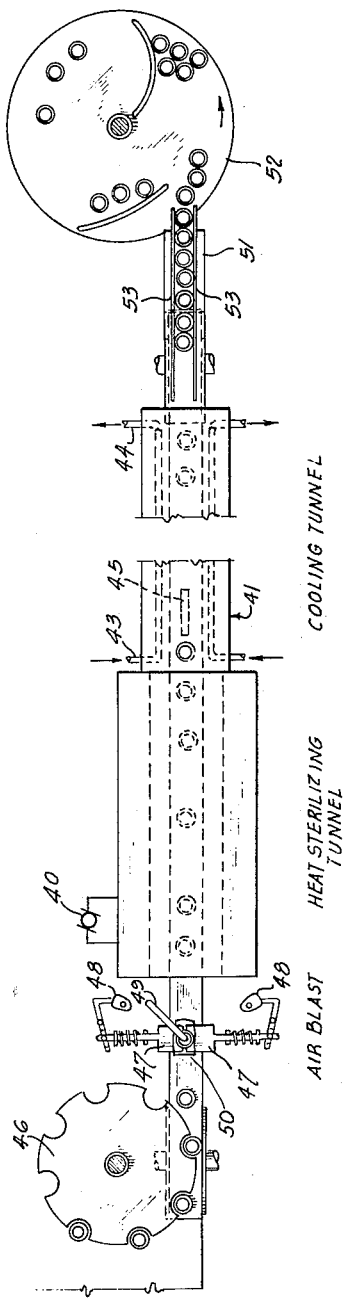
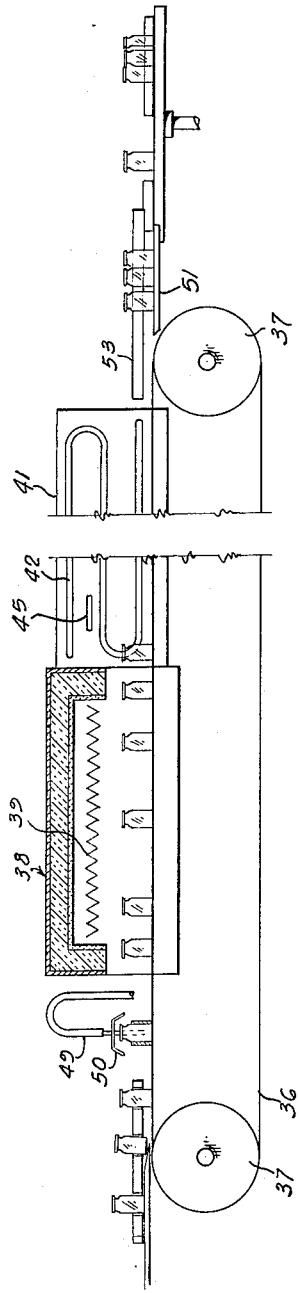

United States Patent Office 3,058,177
Patented Oct. 16, 1962

3,058,177
RAPID HEAT STERILIZATION OF BOTTLES
Arthur Sinclair Taylor, Spring Valley, and Joseph Ames Corley, Sloatsburg, N.Y., assignors to American Cyanamid Company, New York, N.Y., a corporation of Maine
Filed Aug. 20, 1959, Ser. No. 835,103
5 Claims. (Cl. 21—79)

This invention relates to a method of rapidly sterilizing glass bottles for pharmaceutical usage by blowing air under pressure through the bottles to remove dust and other loose contaminants, and then heating the bottles in a radiant heat zone at a temperature above about 420° C. for a period of less than 120 seconds to sterilize the bottles without inducing undue permanent strains in the glass, or solubilizing the glass.

As used herein the term bottles includes vials, ampules, etc.

The bottles may be inverted on hollow carrier spikes and be blown out by air while inverted, or the bottles may be upright, and air jets blown downward into the bottle.

The problems of washing, cleaning and sterilizing have been recognized for a long time. Long before the acceptance of the bacterial theory of disease, and the recognition of the existence of micro-organisms, the advantages of washing and cleanliness were recognized. After Pasteur's developments, and after others had learned to appreciate the effects of micro-organisms and certain attributes of their life cycles, the problem of disinfection and sterilization received extensive study. The most commonly used methods include a chemical agent which will inactivate or remove or affect micro-organisms or the use of heat or a combination of both.

For medicinal preparations which are to be injected parenterally whether subcutaneous, intramuscular, intravenous or otherwise, it has long been recognized that the highest degree of certainty of sterility is required. Where a medicinal preparation is to be injected into the blood stream, or into tissues, not only must the preparation be free from viable micro-organisms but additionally the preparation must be free from pyrogens. These include a class of polysaccharides produced by certain micro-organisms which while not viable or living in the sense that they can reproduce themselves are nonetheless extremely deleterious in that they cause the temperature of the subject to rise upon injection. Obviously such a side reaction is not desirable. Occasionally a rise in temperature of a subject may be desired but only under controlled conditions when such a reaction is sought by the physician or veterinarian in charge.

Methods of sterilization which destroy viable micro-organisms are not always sufficiently rigorous to destroy pyrogenic impurities. Wet heat, such as in a steam pressure autoclave, has been used for a long time to achieve sterilization. Under some conditions dry heat has been used. In the absence of steam a higher temperature is required to destroy micro-organisms and inactivate pyrogens. For glassware which is commonly used as a container for parenteral preparations, long dry heat cycles in the neighborhood of 300° C. have been used. Such cycles have a long hold-up time and frequently keep an undesirably large inventory in process. Additionally, bottles have been washed prior to such sterilization procedures.

At times the prolonged heat cycle required for the sterilization of glass causes an increase in the solubility of the glass in the contents and as a result the more insoluble and expensive type 1 or boro-silicate glass has been required in bottles for parenteral materials.

Glass bottles as they are manufactured by being blown from glass are sterile as formed. When the bottles are placed in shipping containers and shipped for filling, it is impractical to maintain guaranteed sterility. Chance contaminants in shipping render it necessary to resterilize the bottles. Additionally, dust and fragments of packing materials, etc. may fall into the bottles. Even though many of the bottles are, in fact, both clean and sterile when removed from the shipping boxes, the bottles are not reliably sterile and must be again cleaned and sterilized.

It has now been found that glass bottles may be sterilized and rendered pyrogen-free by dry-heating them, with radiant heat, to a temperature above about 420° C. for a period of 120 seconds or to a higher temperature for a shorter period as shown by the curve A—B in the attached drawing, FIGURE 1.

It is remarkable and unexpected that a markedly higher temperature than previously has been found to be acceptable, and a much shorter cycle has given markedly improved results in the sterilization of glass containers.

Glass as used in bottles softens at a temperature not too far above these limits. The exact temperatures vary with the type of glass. Boro-silicate glass has a strain point of about 550° C. and annealing point of about 575° C., and a softening point of about 800° C. This type of glass is normally called type 1 in the pharmaceutical industry. A type 3 glass is a soda-lime glass, with a strain point of about 504° C., an annealing point of about 521° C., and a softening point of 703° C. If the main body of the glass of the bottle reaches a temperature above the strain point, careful cooling is necessary to avoid residual strains. The glass must be slowly cooled between the annealing point and the strain point to avoid leaving residual internal strains in the glass. Uncontrolled internal strains cause the glass bottles to break more easily. Very special conditions are required for surface hardening of glass which is a form of inducing controlled internal stresses.

The exact temperatures of the anneal, strain and softening points vary with the composition of the glass and accordingly the above temperatures are illustrative rather than descriptive of all pharmaceutical glasses.

Attempts have been made to use direct flames for sterilization. Bottles may be rendered sterile by introducing an open flame into the bottle for a period sufficient to kill micro-organisms and inactivate pyrogens. The turbulence of the flowing gasses blows out dust. Unfortunately, the difference between a set of conditions which will reliably render the glass sterile and pyrogen-free and the set of conditions under which the bottle will shatter from heat induced strains is too narrow for convenient manufacturing operations. Similarly, heat which uniformly brings the bottles slowly up to temperature is not as satisfactory as the present concept of using a high temperature environment which brings the surface of the glass up to a sterilizing temperature and renders the surface sterile without the internal portions of the glass necessarily reaching the same temperature. In part this is probably due to the opacity of the micro-organisms and pyrogens to radiant energy at the temperatures in question. Thus the pyrogens and micro-organisms which are to be inactivated absorb heat more rapidly than the comparatively transparent glass and as a result are heated to an inactivating temperature even though the adjacent glass is not quite so hot. Even though glass is transparent to visible light it becomes more opaque to the longer wave lengths corresponding to infra-red radiation and as a result such radiation is more absorbed at the surface of the glass than uniformly through the glass thickness. Fortunately, the cycle for sterilizing and destroying pyrogens can be short enough to not cause undue deleterious strains in the glass, although some slight strains may be caused, which are acceptable.

Any organic matter, such as bacteria and pyrogens, is heated both by contact with the surface of the glass and by radiant energy which is absorbed by such organic matter and accordingly, attains a temperature at least as high as the surface of the glass. As the organic matter starts to char, its absorption increases so that it becomes even hotter than would otherwise be the case. This results in a more rapid disintegration of organic impurities.

Because it is difficult or impossible to accurately ascertain the exact temperature attained by any particular portion of the glass bottle during such a heating cycle, temperature measurements are most conveniently made of the heating chamber such as an oven or tunnel, even though the bottle does not attain the full temperature of its environment. An average temperature of the bottle is comparatively easily measured by calorimetric methods by determining the total heat content and weight. The specific heat of the glass of any bottle over the temperature range under consideration can be obtained by weighing a glass bottle, putting the glass bottle in a muffle furnace long enough to attain temperature equilibrium and then immersing in water in a copper calorimeter and measuring the temperature rise. The specific heat as calculated may vary slightly with glassware of different compositions but is about 0.224 over the temperature ranges and for the types of glassware under consideration.

With the same calorimeter the average temperature attained by a bottle during the sterilization procedure can be determined by dropping the bottle at the end of the heat cycle into the calorimeter and measuring the temperature rise. From calculations using the specific heat of the glass, the average temperature of the glass bottle is calculated. It must be stressed that the average temperature is somewhat below the temperature of the tunnel or muffle because the exposure time is short. The surface of the glass attains a higher temperature and organic matter on the surface of the glass attains a higher temperature than the glass itself. Theoretically at least, a surface pyrometer can be used for measuring the surface temperature of the glass, but practically, the absorption of heat by the pyrometer and the rapidity of temperature changes introduce so many unknown variables that reliable results are not easily obtained.

Theoretically at least, rapid sterilization would be obtained by using a radiant heat source which dropped into the neck of the bottle so that the radiant energy was generated within the bottle itself. Actually, sufficient radiant energy passes through the open neck of the bottle and through the glass itself for the inside of the bottle to attain adequate temperatures.

An additional effect, at least theoretically, is obtained because surface contamination would tend to change the angle of internal reflection at the impurity-glass interface, and would cause grazing radiation to follow a different path than if the impurity were not present.

Some of these considerations are rather highly theoretical and capable of only indirect proof. However, the theory is not too important. The important fact is that the bottles become sterile and pyrogen free.

It is generally accepted that thermal death in sterilizing bacteria is an oxidation process or a protein coagulation and a function of the time-temperature relationship. The rate of killing for a completely homogeneous population of organisms would be an exponential function. However, the populations are not completely homogeneous and the more susceptible organisms are killed more rapidly while the more heat resistant organisms survive for a longer time than might be thought theoretically possible. The thermal death time is in part dependent on the age of the culture, the approximate number of cells and spores, as well as the physical parameters of dimensions of the bottles, thickness of the glass, etc.

For the present purposes, it is found that an electric muffle furnace, as for example a furnace 4 inches by 4 inches by 4 inches, or a long tunnel, for example 14 feet long and of a cross section slightly greater than the largest bottle to be sterilized, give comparable results. Obviously, the muffle furnace is more convenient for experimental work. The tunnel is desirable for larger scale production.

To determine sterility, samples of glassware are internally coated with spore suspensions of test organisms. A standard test is to use spore suspension of *Clostridium sporogenes* and *Bacillus stearothermophilus* and coat part of the inside of the bottles with the culture. Then the bottles are given a heat treatment, thioglycollate broth is added to the bottles and cultured for 72 hours at 37° C. for *Clostridium sporogenes* and 60° C. for *Bacillus stearothermophilus*. Tests are run in triplicate and the kill of the bacteria determined by growth or lack of growth during incubation. The results of trials are shown in FIGURE 1 in which the line C—D shows the relationship between time and temperature required for kill. The temperature is that of the furnace and the time is that of exposure of the bottle in the furnace. Time-temperatures above the curve represent sterility.

The tests for pyrogens show that more rigorous conditions are required to obtain non-pyrogenic bottles. Materials such as Pyrogenic Substance No. 1 obtained from the United States Government or micro-organisms known to produce pyrogens are used as the source. For example, *Pseudomonas aeruginosa* or *Proteus vulgaris*, planted on a blood infusion or trypticase soy agar, are grown for two days at 37° C. Plates are washed with 2 cc. of distilled water and 0.05 cc. of the resulting suspensions is used as a test contaminant for bottles. For consistency, the suspensions are mixed and aspirated through bolting silk and after the bottles are inoculated are dried for one hour at 50° C. in a vacuum oven and then sterilized for 15 minutes at 15 pound steam pressure. Bottles so treated are tested using rabbits by adding water to the bottle, shaking it for one minute to wash down the sides, and then injecting a rabbit with the thus obtained solution.

Control bottles invariably gave a strong pyrogenic response in rabbits. The line defining the conditions between a moderate response and non-response in rabbits is shown by the line A—B in the accompanying FIGURE 1. Conditions corresponding to any point above the line A—B gives sterile and pyrogen free bottles. For operating convenience, it is desirable to use conditions which correspond to a point a reasonable distance from the line A—B to insure that any minor variations in conditions do not permit any bottle to pass through the sterilizing tunnel under conditions below the line A—B. Similarly, conditions far about the line A—B, and those more rigorous than required, can deleteriously affect the glass itself. If the bottle is heated so that an appreciable part is above the strain point, strains are introduced into the glass and, theoretically, annealing would be required to remove such strains. In practice, however, a small amount of strain in the glass does not deleteriously affect the quality of the bottle as a container for parenteral products. Strain in the glass is easily observed by inspecting the glass with polarized light in accordance with usual procedures.

For example, tests at 600° C. for 90 seconds are seen to be in the sterile pyrogen-free area and bottles run under such conditions were tested and found to be sterile, non-pyrogenic and not damaged by the heat cycle. Tests at 800° C. for 30 seconds showed more tendency to induce strains in the glass but gave sterile pyrogen-free bottles which were satisfactory for the packaging of parenteral products. These last conditions are satisfactory for type 1 glass but are more rigorous than are desirable with the use of type 3 glass.

Inasmuch as the softening point of type 1 or boro-silicate glass is about 800° C., it can be seen that the entire bottle has not attained such a temperature during sterilization.

The effect of strain is more apparent in larger bottles. For bottles of 1 to 25 milliliters capacity, sterilization is readily and conveniently accomplished.

For commercial production heating tunnels give very satisfactory results, with a high throughput.

For purposes of convenience in the description, reference will be made to the heat sterilizing tunnel and its operation even though the operation usually is sufficient to give not only sterility but non-pyrogenicity.

The tunnel may be operated under conditions between lines A—B and C—D giving sterile, but not pyrogen-free bottles.

FIGURE 1 is a graph of the time and temperature curves for the heat sterilizing tunnel to give sterility and non-pyrogenicity.

FIGURE 2 is a sectional view (elevation) longitudinally of a spike conveyor sterilizing tunnel.

FIGURE 3 is a lateral section along line 3—3 through the sterilizing tunnel of FIGURE 2.

FIGURE 4 is a sectional view (elevation) longitudinally of an upright bottle sterilizing tunnel.

FIGURE 5 is a plane view of the tunnel of FIGURE 4.

In the accompanying drawings, as shown in FIGURE 2, the total assembly is supported on a frame 11. This frame includes conveyor guides 12 on which a conveyor belt 13 of heat resistant material runs. This conveyor belt has mounted thereon a plurality of hollow spikes 14 which are each long enough to properly support bottles 15 which are being treated. The conveyor belt passes over conveyor belt support wheels 16 which are journalled in the frame and driven by a conveyor drive system not shown. The drive system and conveyor runs are conventional. The support wheel at the bottle receiving end of the conveyor has air ports 17 in the wheel which connect with an air manifold 18 which conducts a blast of high pressure filtered air into each bottle as it passes under a bottle retainer 19. The bottle retainer prevents the bottle from being blown off the spike by the air blast passing there through. A short air blast is sufficient to blow out any dust, lint, and particles of packing material or other impurities which may be in the bottle.

Over the main run of the conveyor is the heat sterilizing tunnel 20 which includes a tunnel shell 21 which conveniently may be of metal, such as steel. Inside of the tunnel shell and spaced therefrom is a refractory lining 22. Between the refractory lining and the tunnel shell is heat insulation 23. On the inside surface of the refractory lining are heating elements 24. The heating elements are conveniently of resistant wire through which electric current is passed from a suitable electric current source 25. The resistance wire is conveniently located in slots in the refractory lining although it may be wound on pegs of refractory material or otherwise maintained inside of the heating tunnel in a convenient manner. The electrical energy input is adjusted to maintain a desired tunnel temperature.

A resistance wire to maintain the internal temperature of the tunnel must have a temperature considerably higher than the average temperature of the tunnel. This means that the radiant energy from the wire is of a shorter wave length than would be the corresponding black body wave length for the tunnel temperature. Glass is more transparent to the shorter wave lengths and hence, by using a hot wire as the source of energy, the radiant energy wave length is shorter than would be the case for uniform tunnel temperatures. This shorter wave length penetrates the glass more readily and hence gives higher temperatures on the inside surface of the bottle than would be obtained if the tunnel were of uniform temperature over its entire periphery or black body conditions prevailed. The upper temperature ranges are in the visible and the resistance wire is preferably on up into the medium red range. As may be observed by inspection, glass is transparent to visible light and hence, the radiant energy which is released in the red range and near infra-red passes through the glass and is available for heating the interior surfaces of the bottle.

The tunnel floor 26 is of a refractory material and has therein a spike slot 27. The spike slot should be just wide enough to pass the spikes on the conveyor belt without dragging. The tunnel floor refractory serves to protect the conveyor mechanism from the radiant heat of the tunnel.

At the front end of the tunnel is an entrance port 28 and at the back end of the tunnel is an exit port 29 which are conveniently just larger than the largest bottle to be passed through the tunnel, allowing for flexibility of bottle placement, to protect the operator from the tunnel, and to reduce heat loss.

Adjacent to the front of the tunnel is a bottle feed chute 30 at the lower end of which is a bottle stop 31. The bottle stop is slotted to permit the mouths of the bottles to project below the bottle slot adajcent to the path of the conveyor spikes so that each conveyor spike passes into the neck of a bottle, lifts the bottle out of the bottle feed chute and permits it to drop down on the spike as the spike proceeds in its path. Additional bottles slide down through the bottle feed ports for subsequent spikes.

At the discharge end of the conveyor is a rotating guide 32 which serves to keep the bottles from sliding off of the spike too quickly as the spike is inverted in passing over the end conveyor belt support wheel. After passing the rotating guide 32 each bottle in turn drops through a discharge port 33 and onto a cooling conveyor 34. The bottles on the cooling conveyor are protected by an anti-contamination shield 35.

In operation, the bottles are fed through the bottle feed port 30 onto the hollow spikes 14, pass through the tunnel, during the course of which they receive a heat treatment and then pass to the cooling conveyor where they are protected from contamination by the anticontamination shield while they are permitted to cool. The length of the cooling conveyor is such that the bottles attain a temperature not markedly above room temperature before passing to the next operation. From the cooling conveyor onward until filled, sterile techniques exclusively are used.

A modified form of conveyor is shown in FIGURES 4 and 5 in which the bottles are shown as being sterilized in an upright position. In this modification a conveyor belt 36 of heat resistant material passes over conveyor belt wheels 37. The conveyor belt may be of a mesh of heat resistant steel but conveniently is of a link type with refractory plates maintained so that on the horizontal flights the refractory plates are in contact and support the bottles.

Over a portion of the conveyor is a heat sterilizing tunnel 38 in which are heat elements 39 powered from a current source 40. The dimensions of the tunnel may be the same as shown in FIGURES 2 and 3 or may be in accordance with other conventional practice. Adjacent to the heat sterilizing tunnel is a cooling tunnel 41 in which the same conveyor belt operates. This cooling tunnel is preferably of metal with a cooling coil 42 attached. A cooling medium such as water flows in through an entrance pipe 43 and out through an exit pipe 44. Conveniently, but not necessarily, the inside surface of the cooling tunnel is smooth so that it may be more easily cleansed. Suspended in the cooling tunnel are sterilizing lamps 45. It is conventional practice to use such sterilizing lamps releasing ultra-violet radiation in sterile areas. The sterilizing lamps do not reliably sterilize the bottles but are used to keep the inside of the tunnel sufficiently free from contamination that the bottles are not contaminated during the cooling operation. It is usually more convenient to sterilize the inside of the cooling tunnel with a chemical agent, and maintain sterility with lamps than to heat sterilize the tunnel.

Bottles are fed onto the conveyor belt 36 by a feed wheel 46 which may be a conventinoal type of feed wheel having bottle retaining slots therein. Bottles are fed to this wheel by hand or suitable machinery conventional in the trade. The bottles are routed onto the belt and near the open end thereof are clamped by positioning jaws 47 driven by cams 48. Such positioning mechanisms are conventional and well known in the art. The bottles are left in the positioning jaws for a short period of time during which an air lance 49 drops down into the bottle and blows any impurities out of the bottle. A vacuum shield 50, conveniently of a transparent plastic, surrounds the air lance and withdraws any particles blown out by the air lance. The vacuum shield prevents particles from being blown out of one bottle and into a bottle which has already been blown out. The timing mechanism for the air lance and the jaws are conventional and release one bottle to pass through the heat sterilizing tunnel just before the jaws grasp the following bottle.

After passing through the heat sterilizing tunnel and the cooling tunnel, the bottles are slid from the conveyor belt onto a dead plate 51 and onto an accumulator plate 52. Guides 53 prevent the bottles from sliding off of the shield or off of the dead plate. The rotating accumulator wheel, in accordance with conventional practice, picks up the bottles and transfers them to succeeding operations.

The dead plate, accumulator plate, and following mechanisms are used in accordance with conventional sterile procedures using a suitable sterile room to protect against contamination.

The cooling tunnel may be divided into sections, so that the temperature of each section is independently controlled. By having the section closest to the sterilizing tunnel at the highest temperature, the initial rate of cooling of the bottle is reduced, which reduces the tendency to induce strains in the glass. The final section may be chilled to lower the bottle temperature to room temperature more rapidly.

In operation, the first of the conveyor belts with the inverted or upright bottles are driven at such a rate that the retention time in the heat sterilizing tunnel is above the curve A—B shown in FIGURE 1. Conveniently, a factor of safety is used and, for example, the tunnels are operated at a temperature of 600° C. as measured by a thermocouple inserted in the tunnel, and the time of the passage is 60 seconds.

Under such conditions, it is found that bottles are sterile and non-pyrogenic.

One of the important advantages of the present device is that the bottles need not be washed before being sterilized. Bottles shipped from the glass factory are protected against major contamination and only small particles of packing material are found within the bottles, such particles are removed by the air blast.

When conventionally washed and sterilized by being held at a temperature of 275° C. for five hours and then being permitted to cool in sterile trays, type 3 pharmaceutical glass bottles, a soda-lime glass, are found to have a surface solubility. When 10 milliliter bottles are filled with pure water and the water tested, it is found to have a conductivity equivalent to that of 2.2 parts per million sodium chloride and a pH of 8.7. The same bottles are sterilized by tunnel passage time of one minute at 600° C. and then cooled, on filling with water are found to give a 1.3 parts per million sodium chloride conductivity equivalent and a pH of 7.2. This reduction in impurities is sufficient to permit the more economical type 3 glass to be used for many purposes where conventional cleaning procedures would require the use of a type 1 boro-silicate glass which is much more expensive. Thus, the use of the present sterilizing tunnels not only reduces the cost of cleaning the bottles, but actually permits the use of a more inexpensive form of glass bottles for many purposes.

In all tests using *Pseudomonas aeruginosa* or *Proteus vulgaris* or Pyrogenic Substance No. 1, the bottles are found to be clean and sterile and pyrogen-free after passage through the tunnel at a temperature of 600° C. and a passage time of 60 seconds.

For bacterial destruction, including bacterial spores, but not pyrogen deactivation, it is found that a temperature of 400° C. for 120 seconds, 500° C. for 60 seconds, 600° C. for 30 seconds and 800° C. for 20 seconds gives a sterile bottle although not free from pyrogens.

The less rigorous conditions as shown by the line C—D in FIGURE 1 render the bottles sterile although pyrogenic. For some operations, mere sterility is sufficient.

Bottles subjected to conditions above the line A—B are both sterile and pyrogen free and unless the tunnel is operated well above the line A—B are normally found to be as strain free as supplied by the manufacturer when examined by polarized light. In view of the variation in the characteristics of bottles due to different glass compositions and the different shapes and thickness of various portions of various bottles, actual operating limits for strain free bottles must be experimentally determined.

We claim:

1. A method of rapidly sterilizing glass bottles and rendering them pyrogen free comprising: placing the bottles on a carrier, blowing air under pressure into the bottles, thereby removing any loose particles, moving the bottles into a radiant heat zone, radiantly heating the bottles with radiation a substantial portion of which is in the infrared range and red range, heating zone being at a temperature and time of bottle passage above the time-temperature line A—B, in FIGURE 1, but sufficiently short that the bottles remain strain free and undistorted, transferring the bottles into a zone in which they are protected from contamination, and cooling the glass bottles, while protecting same from contamination, thereby minimizing the solubilizing effect of the sterilizing operation.

2. A method of rapidly sterilizing glass bottles and rendering them pyrogen free comprising: placing the bottles on individual hollow carrier spikes, blowing air under pressure through said spikes into the bottles, while retaining the bottle on the spikes, thereby removing any loose particles, moving the spike mounted bottles into a radiant heat zone, radiantly heating the bottles with radiation a substantial portion of which is in the infra-red range and red range, the heating zone being at a temperature and time of bottle passage above the time-temperature line A—B, in FIGURE 1, but sufficiently short that the bottles remain strain free and undistorted, discharging the bottles from the spikes in a zone in which they are protected from contamination, and cooling the bottles, while protecting same from contamination, thereby minimizing the solubilizing effect of the sterilizing operation.

3. A method of rapidly sterilizing glass bottles and rendering them pyrogen-free comprising: placing the bottles in mouth down position on individual hollow carrier spikes, holding the bottle on said spikes while blowing air under pressure through said spikes into the bottles, thereby removing any loose particles, moving the spike mounted bottles into a radiant heat zone, radiantly heating the bottles with radiation a substantial portion of which is in the infra-red range and red range, the heating zone being at a temperature and time of bottle passage above the time-temperature line A—B, in FIGURE 1, but sufficiently short that the bottles remain strain free and undistorted, discharging the bottles from the spikes in a zone in which they are protected from contamination, and cooling the bottles, while protecting same from contamination, thereby minimizing the solubilizing effect of the sterilizing operation.

4. A method of rapidly sterilizing type 3 pharmaceutical glass bottles, the glass of which has a strain point of about 504° C., and rendering them pyrogen-free and of low solubility comprising separately and sequentially: placing the bottles in inverted position on a carrier, blowing air under pressure into the bottles while retaining in position, thereby removing any loose particles, moving the bottles into a radiant heat zone, radiantly heating the bottles with radiation a substantial portion of which is in the infra-red and red range, the heating zone being at a temperature of about 600° C. and the time of bottle passage about 60 seconds, and therefore above the time-temperature line A—B, in FIGURE 1, and also sufficiently short that the bottles remain strain free and undistorted, transferring the bottles into a zone in which they are protected from contamination, and promptly and rapidly cooling the bottles, while protecting same from contamination, thus obtaining bottles which in the 10 milliliter size, on filling with pure water, dissolve to the extent of about 1.3 parts per million sodium chloride conductivity equivalent, and a pH of about 7.2.

5. A method of rapidly sterilizing type 3 pharmaceutical glass bottles, the glass of which has a strain point of about 504° C., and rendering them pyrogen-free and of low solubility comprising separately and sequentially: placing the bottles in upright position on a carrier, retaining in position while blowing air under pressure into the bottles, sucking away discharged particles, thereby removing any loose particles, moving the bottles into a radiant heat zone, radiantly heating the bottles with radiation a substantial portion of which is in the infra-red and red range, the heating zone being at a temperature of about 600° C. and the time of bottle passage about 60 seconds, and therefore above the time-temperature line A—B, in FIGURE 1, and also sufficiently short that the bottles remain strain free and undistorted, transferring the bottles into a zone in which they are protected from contamination, and promptly and rapidly cooling the bottles, while protecting same from contamination, thus obtaining bottles which in the 10 milliliter size, on filling with pure water, dissolve to the extent of about 1.3 parts per million sodium chloride conductivity equivalent, and a pH of about 7.2.

References Cited in the file of this patent

UNITED STATES PATENTS

| | | |
|---|---|---|
| 2,321,152 | Mengle | June 8, 1943 |
| 2,331,266 | Cramer | Oct. 5, 1943 |
| 2,332,099 | McKinnis | Oct. 19, 1943 |
| 2,521,793 | Howe | Sept. 12, 1950 |